United States Patent
Droux et al.

(10) Patent No.: US 10,066,513 B2
(45) Date of Patent: *Sep. 4, 2018

(54) METHOD FOR OPERATING A COMBINED-CYCLE POWER PLANT WITH COGENERATION, AND A COMBINED-CYCLE POWER PLANT FOR CARRYING OUT THE METHOD

(71) Applicant: General Electric Technology GmbH, Baden (CH)

(72) Inventors: Francois Droux, Oberrohrdorf (CH); Dario Ugo Breschi, Anjoutey (FR); Karl Reyser, Kuessaberg (DE); Stefan Rofka, Nussbaumen (CH); Johannes Wick, Beinwil am See (CH)

(73) Assignee: General Electric Technology GmbH, Baden (DE)

( * ) Notice: Subject to any disclaimer, the term of this patent is extended or adjusted under 35 U.S.C. 154(b) by 259 days.

This patent is subject to a terminal disclaimer.

(21) Appl. No.: 14/559,338

(22) Filed: Dec. 3, 2014

(65) Prior Publication Data

US 2015/0082803 A1    Mar. 26, 2015

Related U.S. Application Data

(63) Continuation of application No. 13/863,506, filed on Apr. 16, 2013, now Pat. No. 8,984,894, which is a (Continued)

(30) Foreign Application Priority Data

Oct. 19, 2010    (EP) ..................................... 10188069

(51) Int. Cl.
  *F02C 6/18*    (2006.01)
  *F01K 23/18*    (2006.01)
  (Continued)

(52) U.S. Cl.
  CPC .............. *F01K 23/101* (2013.01); *B01D 1/26* (2013.01); *C02F 1/16* (2013.01); *F01K 7/165* (2013.01);
  (Continued)

(58) Field of Classification Search
  CPC .... F02C 6/18; F02C 6/04; F02C 6/003; F02C 3/16; F01K 23/101; F01K 23/103;
  (Continued)

(56) References Cited

U.S. PATENT DOCUMENTS 2,663,144 A    12/1953    Nordstrom et al.
3,451,220 A *    6/1969    Buscemi ................. F01K 3/265
                                                                159/2.3

(Continued)

FOREIGN PATENT DOCUMENTS

JP    62-143047    9/1987
JP    62-143047 U    9/1987
(Continued)

OTHER PUBLICATIONS

Office Action (Notification of Reasons for Refusal) dated Jan. 19, 2015, by the Japanese Patent Office in corresponding Japanese Patent Application No. 2013-534236, and an English translation of the Office Action. (9 pages).

(Continued)

*Primary Examiner* — Andrew Nguyen
(74) *Attorney, Agent, or Firm* — GE Global Patent Operation; Marc A. Vivenzio

(57) ABSTRACT

The invention relates to a method for operation of a combined-cycle power plant with cogeneration, in which method combustion air is inducted in at least one gas turbine, and in which method the exhaust gas emerging from the at least one turbine is passed through a heat recovery steam generator (HRSG) in order to generate steam. The electricity produc- (Continued)

tion can be decoupled from the steam production in order to restrict the electricity production while the heat provided by steam extraction remains at a constant level. A portion of the inducted combustion air can be passed through at least one turbine to the HRSG without being involved in the combustion of the fuel in the gas turbine. This portion of the combustion air can be used to operate at least one supplementary firing in the heat recovery steam generator.

17 Claims, 3 Drawing Sheets

Related U.S. Application Data continuation of application No. PCT/EP2011/067208, filed on Mar. 10, 2011.

(51) Int. Cl.
| | | |
|---|---|---|
| *F01K 23/10* | (2006.01) | |
| *C02F 1/16* | (2006.01) | |
| *F01K 17/04* | (2006.01) | |
| *F02C 6/04* | (2006.01) | |
| *F02C 6/10* | (2006.01) | |
| *B01D 1/26* | (2006.01) | |
| *F01K 7/16* | (2006.01) | |
| *C02F 1/04* | (2006.01) | |
| *C02F 103/08* | (2006.01) | |

(52) U.S. Cl.
CPC .............. *F01K 17/04* (2013.01); *F01K 23/10* (2013.01); *F01K 23/103* (2013.01); *F01K 23/18* (2013.01); *F02C 6/04* (2013.01); *F02C 6/10* (2013.01); *F02C 6/18* (2013.01); *C02F 1/041* (2013.01); *C02F 2103/08* (2013.01); *Y02E 20/14* (2013.01); *Y02E 20/16* (2013.01); *Y02P 70/34* (2015.11)

(58) Field of Classification Search
CPC ........ F01K 23/105; F01K 23/10; F01K 23/18; F01K 7/165; F01K 23/064; F01K 17/02; F01K 17/04; Y02E 20/16
See application file for complete search history.

(56) References Cited

U.S. PATENT DOCUMENTS

| | | |
|---|---|---|
| 4,081,956 A | 4/1978 | Baker et al. |
| 5,737,912 A | 4/1998 | Krakowitzer |
| 5,904,040 A | 5/1999 | Hums et al. |
| 6,256,978 B1 | 7/2001 | Gericke et al. |
| 6,560,966 B1 | 5/2003 | Fetescu et al. |
| 6,574,966 B2 | 6/2003 | Hidaka et al. |
| 6,820,428 B2 | 11/2004 | Wylie |
| 7,269,956 B2 | 9/2007 | Gericke et al. |
| 7,922,873 B2 | 4/2011 | St. Germain et al. |
| 8,434,312 B2 | 5/2013 | Eroglu et al. |
| 8,511,093 B2 | 8/2013 | Oguchi et al. |
| 8,794,008 B2 | 8/2014 | Eroglu et al. |
| 2003/0154721 A1 | 8/2003 | Elwood et al. |
| 2004/0172947 A1* | 9/2004 | Takahama ................. F02C 6/18 60/772 |
| 2007/0137213 A1 | 6/2007 | Rickert et al. |
| 2009/0064654 A1 | 3/2009 | Kirzhner et al. |
| 2010/0275610 A1 | 11/2010 | Oguchi et al. |
| 2011/0289897 A1* | 12/2011 | Fujita ....................... C10G 7/00 60/39.12 |
| 2012/0017601 A1 | 1/2012 | Eroglu et al. |
| 2013/0219904 A1 | 8/2013 | Eroglu et al. |

FOREIGN PATENT DOCUMENTS

| | | |
|---|---|---|
| JP | 09-133007 A | 5/1997 |
| JP | 10-047015 | 2/1998 |
| JP | 10-047015 A | 2/1998 |
| JP | 2006-097484 A | 4/2006 |
| JP | 2006097484 A | 4/2006 |
| JP | 2009-079580 A | 4/2009 |
| JP | 2009079580 A | 4/2009 |
| RU | 2 142 566 C1 | 12/1999 |
| RU | 2 217 615 C2 | 11/2003 |
| RU | 2 237 815 C2 | 10/2004 |
| WO | 2010/112318 A1 | 10/2010 |
| WO | 2010112318 A1 | 10/2010 |

OTHER PUBLICATIONS

Japanese Patent Application No. 2013-534236, Office Action dated Jan. 19, 2015 (Japanese).
Japanese Patent Application No. 2013-534236, Office Action dated Jan. 19, 2015 (English).
Office Action (Decision on Grant) dated Apr. 21, 2015, by the Russian Federal Service for Intellectual Property in corresponding Russian Patent Application No. 2013122799, and an English translation of the Office Action. (15 pages).
Pratyush et al., Low Load Operational Flexibility for Siemens F- & G-Class Gas Turbines, Proceedings of ASME Turbo Expo 2010: Power for Land, Sea and Air, Jun. 14-18, 2010, GT2010-22055, Glasgow, UK.

* cited by examiner

METHOD FOR OPERATING A COMBINED-CYCLE POWER PLANT WITH COGENERATION, AND A COMBINED-CYCLE POWER PLANT FOR CARRYING OUT THE METHOD

TECHNICAL FIELD

The present invention relates to the field of power-plant technology and relates in particular to a method for operation of a combined-cycle power plant with a gas turbine, at least one steam turbine, and a heat recovery steam generator and a cogeneration process operated by heat provided by steam extraction. It also relates to a combined-cycle power plant for carrying out the method.

PRIOR ART

Certain areas of use of power plants demand simultaneous generation of electricity and heat. The two forms of energy that are produced are not necessarily subject to the same demand profile by the connected consumers. The electricity production is traditionally governed by the requirements of the electrical power supply system, or in some cases by large local industrial consumers. The demand for heat is typically governed by the requirements of an industrial process or by the daily or seasonal fluctuations in a district-heating network or a drinking-water processing installation. With regard to the last-mentioned drinking water processing, those nations, which have a large number of seawater desalination plants are subject to severe fluctuations in the demand for electrical power over the year, while the requirement for drinking water is largely constant over time.

A large proportion of the heat requirement is in general provided by extraction of steam from the steam turbine or from the main steam lines in a thermal power plant. If the steam is generated in a waste heat steam generator (heat recovery steam generator HRSG) in a combined-cycle power plant, its generation is directly linked to the load control of the gas turbine, and therefore cannot be completely decoupled from the electricity generation.

The design and operation of a gas turbine are normally concentrated on high efficiency during electricity generation. Although partial load operation of the gas turbine is possible within certain limits, it is, however, limited by the hazardous substance emissions, which increase when the load is low. During partial load operation, the combustion air flows and exhaust gas flows through the gas turbine are normally reduced, as a result of which the steam generation in the heat recovery steam generator, which follows downstream is restricted at the same time.

Various operating methods have previously been proposed for a combined-cycle power plant when the electricity demand is low and the heat requirement is high (for example as occurs when sea water is vaporized in sea-water desalination plants, which are operated using steam):

One known option for controlling low electricity production is to restrict the inlet valves of the steam turbine or even to close them completely, and to pass the excess steam to a water-cooled or air-cooled condenser, bypassing the turbine.

Another known option for maximizing the steam generation independently of the load on the gas turbine is to provide a fan, in order to provide the necessary additional air, which is required for large supplementary firing in the heat recovery steam generator.

One very simple solution is to provide an auxiliary tank, which produces the steam for the consumers, in order to allow the gas turbines to be shut down independently of this.

If the power plant has a plurality of gas turbine units, some of the units can be switched off in order to reduce the electricity generation if the supplementary firing in the heat recovery steam generator is dimensioned sufficiently large that the steam extraction can be continued at the same level as if all the gas turbine units were in operation. A comparable solution is disclosed in the document EP 1 701 006 A2. A solution such as this requires additional hardware complexity for the steam lines, the safety valves, and the steam bypass lines.

The steam extracted from a combined-cycle power plant can be used for a cogeneration process such as a seawater desalination plant with multiple-effect distillation units (MED). This type of plant normally requires a comparatively low temperature and a low pressure, since the seawater vaporization takes place below atmospheric pressure. In a typical installation, the steam is therefore extracted at the outlet from the low-pressure turbine. This configuration assists high electricity production in the combined-cycle power plant, since the low extraction pressure allows better expansion of the steam in the steam turbine.

An improved type of desalination is known by the name multiple-effect distillation with thermal vapor compression (MED-TCV), as for example disclosed in WO 2005/105255 A1. In this method, the multiple-effect distillation is carried out using a thermocompressor (which operates like a conventional steam jet ejector), in order to pass the steam back from the vaporization cell at the lowest temperature to that at the highest temperature. The operation of the steam jet ejectors leads to a higher pressure level in the steam extraction line in the combined-cycle power plant. The advantage of this configuration is reduced steam consumption for the same amount of drinking water produced, compared with simple multiple-effect distillation. On the other hand, the higher steam extraction pressure leads to a slight reduction in the electricity production in the combined-cycle power plant.

SUMMARY OF THE INVENTION

One object of the invention is to specify a method for operating a combined-cycle power plant with cogeneration, which avoids the disadvantages of the known methods and allows a high heat output and reduced electricity production at the same time without excessively increasing the hazardous emissions in the exhaust, as well as a combined-cycle power plant for carrying out the method.

The object is achieved by the features of the claims. In the method according to the invention, combustion air is inducted in at least one gas turbine, is compressed and is supplied to at least one combustion chamber for combustion of a fuel, and the resultant exhaust gas is expanded in at least one turbine, producing work, wherein the exhaust gas, which emerges from the at least one turbine is passed through a heat recovery steam generator in order to generate steam, which generator is part of a water-steam circuit with at least one steam turbine, a condenser, a feedwater tank and a feedwater pump, wherein heat is provided by extracting steam from the at least one steam turbine. The method according to the invention comprises, in order to restrict the electricity production while the heat provided by means of steam extraction remains at a constant level, a portion of the inducted combustion air is passed through the at least one turbine to the heat recovery steam generator without being involved in the combustion of the fuel in the gas turbine, and in that this portion of the combustion air is used to operate at least one supplementary firing in the heat recovery steam generator.

One embodiment of the method according to the invention is characterized in that the at least one gas turbine has only one combustion chamber and only one turbine for expansion of the exhaust gases, and in that that portion of the compressed combustion air, which is not used for combustion of the fuel is passed to the turbine, bypassing the combustion chamber.

Another embodiment of the method according to the invention is characterized in that the at least one gas turbine is designed for sequential combustion and comprises two combustion chambers and two turbines for expansion of the exhaust gases, and in that that portion of the compressed combustion air, which is not used for combustion of the fuel is provided for operation of the supplementary firing by switching off the second of the two sequentially arranged combustion chambers.

A further embodiment of the method according to the invention is characterized in that the at least one gas turbine is provided with variable inlet guide vanes and in that the inlet guide vanes are at the same time set to the maximum open position when the second combustion chamber is switched off.

Another embodiment is characterized in that a portion of the compressed combustion air additionally bypasses the first of the two sequentially arranged combustion chambers.

A further embodiment is characterized in that the at least one supplementary firing is arranged at the input to the heat recovery steam generator.

According to another embodiment, the heat recovery steam generator contains a first superheater, wherein a second supplementary firing is arranged downstream from the first superheater.

Another embodiment of the method according to the invention is characterized in that the steam extracted is used in a desalination plant for sea-water desalination, which desalination plant can optionally be operated with low-pressure steam or intermediate-pressure steam, and in that, in order to restrict the electricity production, the operation of the desalination plant is additionally converted from intermediate-pressure steam to low-pressure steam.

Yet another embodiment of the method according to the invention is characterized in that the desalination plant comprises units for multiple-effect distillation which operate with low-pressure steam and are additionally each equipped with an apparatus, which operates with intermediate-pressure steam, for thermal vapor compression, and in that the apparatuses for thermal vapor compression are switched on in order to restrict the electricity production.

The combined-cycle power plant according to the invention for carrying out the method comprises at least one gas turbine with a compressor for compression of inducted combustion air, a combustion chamber for combustion of a fuel using the compressed combustion air, and a turbine for expansion of the exhaust gases created during the combustion as well as a water-steam circuit with at least one steam turbine and a heat recovery steam generator, through which the exhaust gases which emerge from the gas turbine flow, wherein the capability to extract steam is provided for the steam turbine. It is characterized in that a controllable bypass is provided in the at least one gas turbine, via which a portion of the compressed combustion air can be introduced into the turbine, bypassing the combustion chamber, and in that a supplementary firing is provided in the heat recovery steam generator, in which fuel can be burnt in order to heat the exhaust gases introduced, using the combustion air which is passed via the bypass.

One embodiment of the combined-cycle power plant according to the invention is characterized in that a valve is arranged in the bypass.

Another embodiment is characterized in that the at least one gas turbine is designed for sequential combustion, and has two combustion chambers and two turbines for expansion of the exhaust gases.

A further embodiment is distinguished in that the combined-cycle power plant has an associated desalination plant, which processes the steam extracted from the steam turbine for sea-water desalination, and in that the desalination plant comprises multiple-effect distillation devices, which are supplied with low-pressure steam from the steam Another embodiment is characterized in that each multiple-effect distillation device has an associated thermal vapor compression device, which is operated with intermediate-pressure steam from the steam turbine, and in that the thermal vapor compression devices are designed such that they can be switched off.

Yet another embodiment is characterized in that first supplementary firing is arranged in the heat recovery steam generator at the input of the heat recovery steam generator, and second supplementary firing is arranged downstream from a first superheater.

BRIEF DESCRIPTION OF THE FIGURES

The invention will be explained in more detail in the following text with reference to exemplary embodiments in conjunction with the drawing, in which.

BEST MODES FOR CARRYING OUT THE INVENTION

An operating concept for the gas turbine in a combined-cycle power plant with cogeneration, which results in a large exhaust gas flow from the gas turbine with a low exhaust gas temperature at the same time opens up a wide range for supplementary firing in the heat recovery steam generator, thus making it possible to ensure high steam production for a connected desalination plant, which is operated using the steam, even when the demand for electricity from the grid system is low at the same time. The supplementary firing can in this case be restricted to the input of the heat recovery steam generator as a result of which, however, the steam production is restricted. If, in contrast, further supplementary firing is additionally provided between the superheaters which are arranged in the heat recovery steam generator, the steam production can be increased considerably, but the steam turbine will probably have to be switched off because the temperature level of the steam produced at the output of the heat recovery steam generator is too low.

Figure 1:
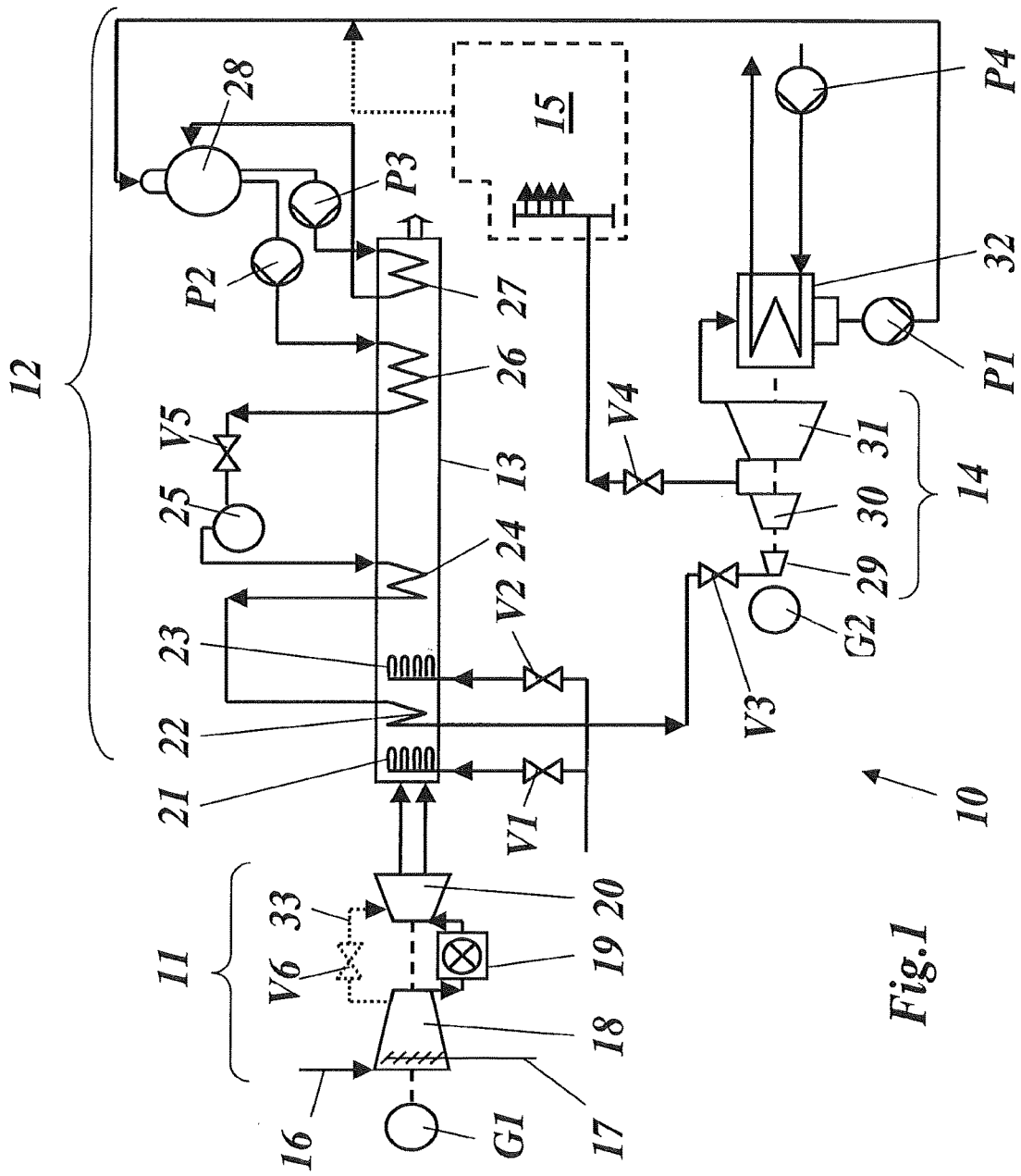
FIG. 1 shows a simplified schematic of a combined-cycle power plant with a connected desalination plant according to one exemplary embodiment of the invention.

FIG. 1 shows a simplified installation layout of a combined-cycle power plant with a connected desalination plant according to one exemplary embodiment of the invention, by means of which a corresponding operating concept can be implemented. The illustrated combined-cycle power plant 10 comprises a gas turbine 11, a water-steam circuit 12 and a desalination plant 15. The gas turbine 11, which drives a first generator G1, comprises a compressor 18, a combustion chamber 19 and a turbine 20. The compressor 18 inducts combustion air via an air inlet 16, compresses it and then emits it to the combustion chamber 19, where together with a fuel that is introduced, it feeds a combustion process which produces hot exhaust gases, which are expanded in the downstream turbine 20, producing work. The amount of inducted combustion air can be controlled via variable inlet guide vanes 17.

The hot exhaust gas from the gas turbine 11 flows through a heat recovery steam generator HRSG 13, which is arranged in the water-steam circuit 12, in order there to convert feedwater, from a feedwater tank 28, to superheated steam via appropriate economizers 26, 27 and superheaters 22, 24. Appropriate pumps P2 and P3 are provided in order to direct the feedwater to the HRSG 13. Furthermore, a high-pressure drum 25 is provided in a manner known per se, as well as a valve V5, by means of which the inlet flow to the high-pressure drum 25 can be controlled. The high-pressure steam, which is produced in the heat recovery steam generator 13 is fed via a valve V3 of the high-pressure turbine 29 to a steam turbine 14, which is arranged in the water-steam circuit and drives a further generator G2, where it is expanded to an intermediate pressure, before entering an intermediate-pressure turbine 30 of the steam turbine 14. The low-pressure steam exhausted by the intermediate-pressure turbine 30 is then passed through a corresponding low-pressure turbine 31, in order finally to be condensed in a condenser 32 and pumped back to the feedwater tank 28 by means of a condensate pump P1. A cooling medium, which is conveyed by means of a further pump P4, flows through the condenser 32.

Figure 3:
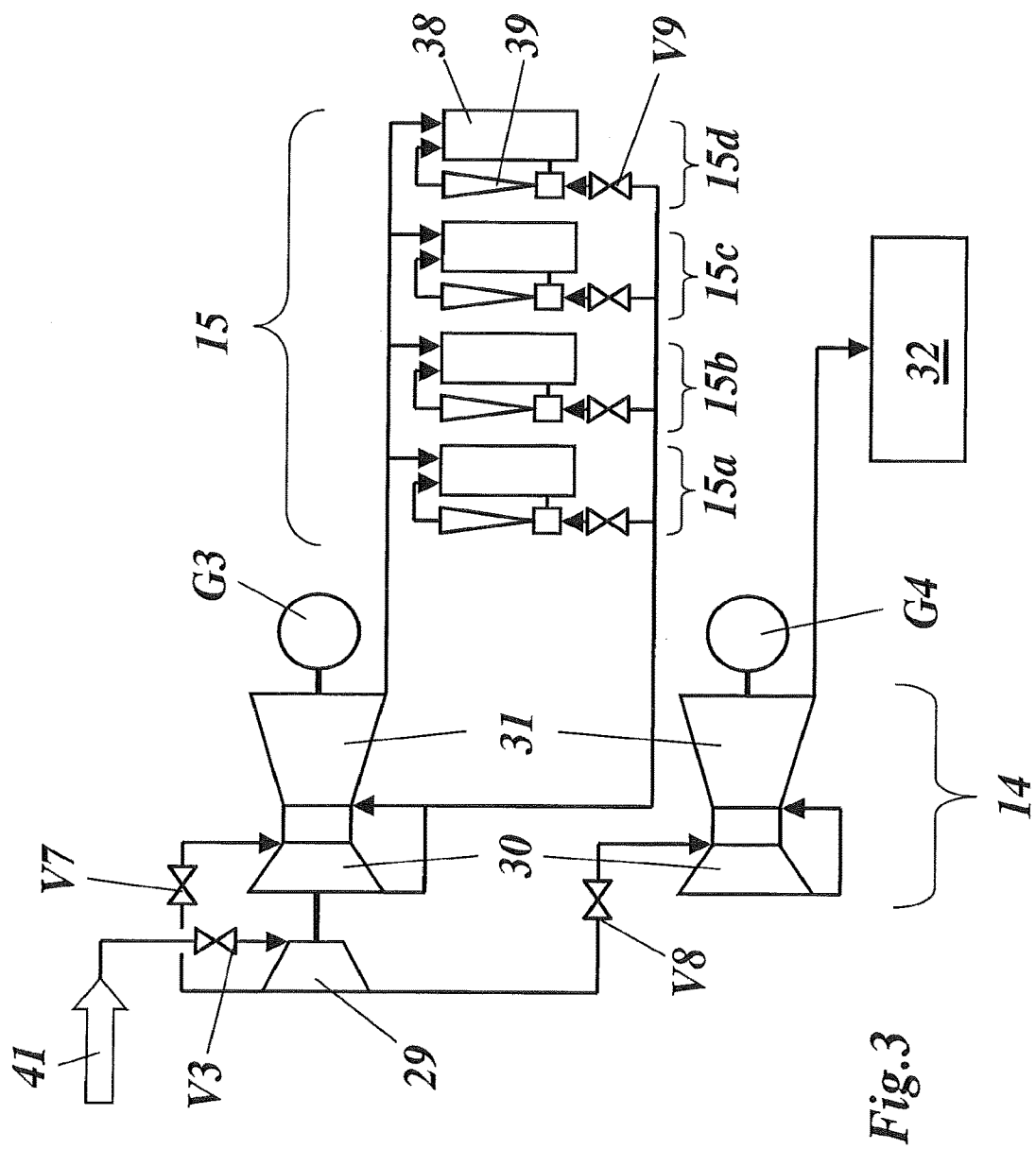
FIG. 3 shows a schematic of a desalination plant, which can be operated within the scope of the invention selectively only with low-pressure steam or with low-pressure steam and intermediate-pressure steam.

Steam is extracted from the steam turbine 14 via a valve V4 between the intermediate-pressure turbine 30 and the low-pressure turbine 31, and is fed to a desalination plant 10, which, for example, may be designed as shown in FIG. 3. The condensate created in the desalination plant is fed back into the circuit via a dotted line in FIG. 1.

In the installation shown in FIG. 1, two supplementary firings 21 and 23 are provided in the heat recovery steam generator 13, one (21) of which is arranged directly at the input of the heat recovery steam generator 13 (so-called "duct firing"), while the second (23) is arranged between the two superheaters 22 and 24 (so-called "inter-bank firing"). Both supplementary firings 21 and 23 are supplied with suitable fuel via appropriate valves V1 and V2.

The special feature of the installation shown in FIG. 1 is now that a variable proportion of the combustion air that has been compressed in the compressor 18 bypasses the combustion chamber 19 via a bypass 33, which is arranged in the gas turbine 11 and can be controlled by means of a valve V6, and this proportion of the combustion air is therefore not involved in the combustion in the gas turbine 11. This ensures a constantly high exhaust gas mass flow even when the load on the gas turbine 11 is relatively low. Such operation leads to a lower exhaust gas temperature, which allows independent control of the steam generation by means of the supplementary firings 21 and 23 in the heat recovery steam generator 13.

At the same time, because of the reduced combustion air flow, suitable combustion parameters can be maintained in the combustion chamber 19, with the consequence that the hazardous-substance emission can be kept low even when the load on the gas turbine is comparatively low. Since the oxygen content in the exhaust gas from the gas turbine is increased considerably in comparison to conventional operation as a result of bypass operation, the supplementary firing in the heat recovery steam generator 13 can be operated on a large scale without additional external air.

Figure 2:
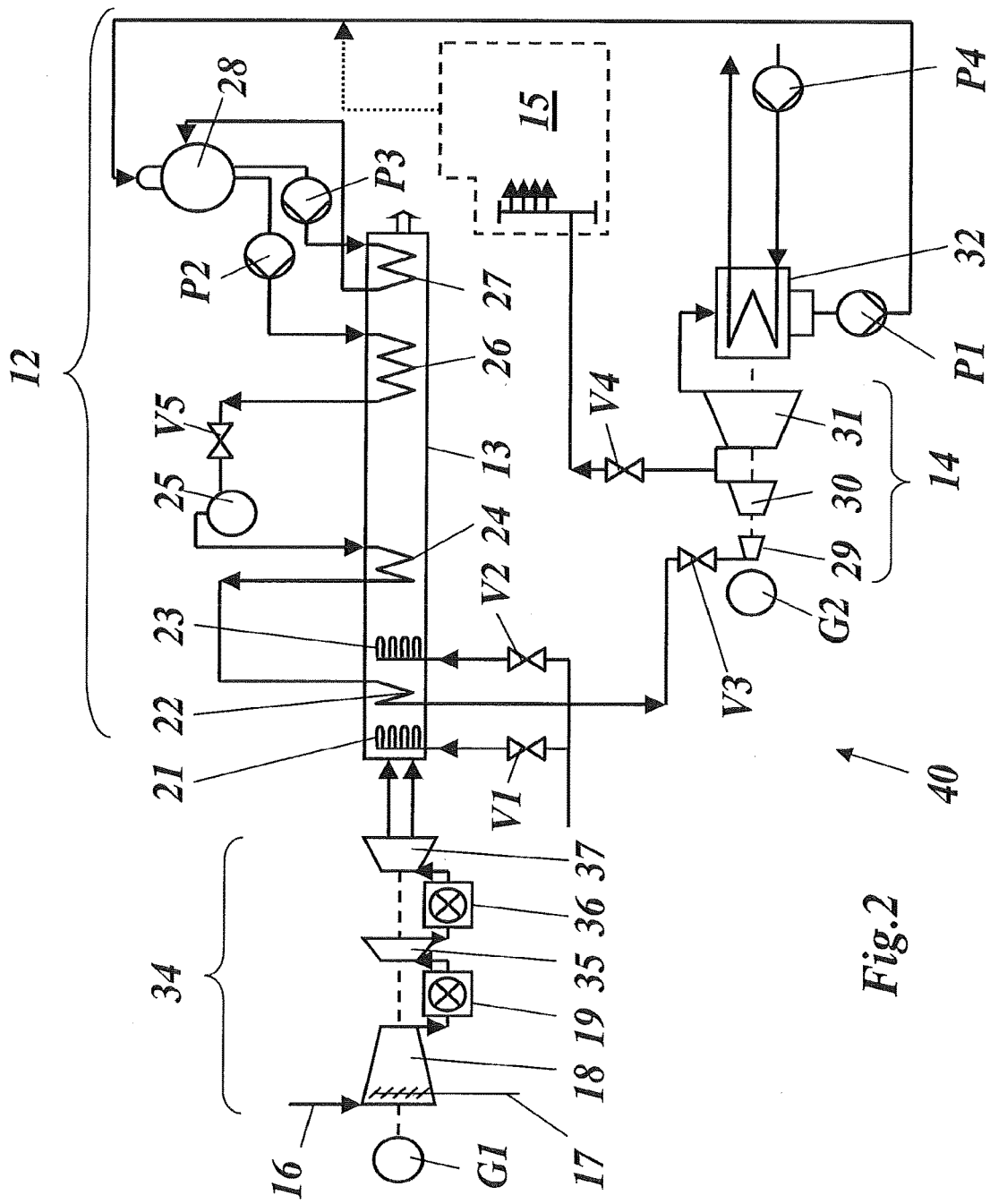
FIG. 2 shows a schematic of a combined-cycle power plant comparable to that in FIG. 1, in particular with sequential combustion in the gas turbine and a connected desalination plant, as is suitable for carrying out the method according to the invention.

Another possible way to implement a comparable method is shown in FIG. 2 for a combined-cycle power plant 40, which comprises a gas turbine 34 with sequential combustion. In the case of sequential combustion such as this, as is known by way of example from the document EP 1 914 407 A2, first and second combustion chambers 19 and 36, respectively, in the gas turbine 34 are respectively connected one after the other to a downstream expansion turbine 35 and 37, respectively. In this case, when the electricity production is restricted, the second combustion chamber 36 is switched off, and the inlet guide vanes 17 are opened completely at the same time. This maintains the full exhaust gas mass flow even when the load on the gas turbine 34 is comparatively low, with the first combustion chamber 19 being operated close to its nominal operating point and with the hazardous-substance emissions remaining low.

The resultant exhaust gas temperature is low, and, even in this situation, allows independent control of the steam generation by means of the supplementary firings in the heat recovery steam generator 13. The oxygen content in the exhaust gas of the gas turbine is also considerably increased in comparison to conventional operation in this type of operation, allowing the supplementary firing in the heat recovery steam generator 13 to be operated on a large scale without additional external air.

However, in addition to switching off the second combustion chamber 36, it is also possible to provide a bypass, as shown in FIG. 1, for the first combustion chamber 19, in order to supply a proportion of the compressed air, bypassing the first combustion chamber 19. This makes it possible to ensure that the first combustion chamber 19 can be operated with a flame temperature close to the nominal operating point, and to ensure that this results in a low exhaust gas temperature with a high mass flow at the same time, as a result of which, as already described above, independent control of the steam generation by the supplementary firings 21 and 23 is possible.

The two supplementary firings 21 and 23 illustrated in FIG. 1 and FIG. 2 have the advantage that the first additional firing 21 essentially makes it possible to ensure a minimal steam temperature at the outlet of the heat recovery steam generator 13, in order to keep the steam turbine 14 within its load limits, while the purpose of the second supplementary firing 23 is essentially to generate and to control the desired amount of steam.

A further influencing option consists in designing the desalination plant 15, as shown in FIG. 3, such that it can be operated via separate extraction lines selectively with intermediate-pressure steam from the intermediate-pressure turbine 30 or with low-pressure steam from the low-pressure turbine 31. This can be done by using desalination units 15a-15d in the desalination plant 15, with so-called multiple-effect distillation devices (MED) 38 in combination with thermal vapor compression devices (TCV) 39. The multiple-effect distillation devices 38 require low-pressure steam at a pressure of about 0.5 bar, while the thermal vapor compression devices 39 require steam at a pressure of about 3 bar.

In the exemplary embodiment shown in FIG. 3, a steam turbine 14 is shown having a common high-pressure turbine 29 and intermediate-pressure and low-pressure turbines 30 and 31 arranged in two parallel paths, which respectively drive a generator G3 and G4 and receive intermediate-pressure steam from the high-pressure turbine 29 via valves V7 and V8, while the high-pressure turbine 29 receives high-pressure steam 41 via the valve V3. The desalination plant 15 is connected to the upper path of the steam turbine 14, with the operation of the thermal vapor compression devices 39 being controlled via appropriate valves V9. The lower path interacts directly with the condenser 32.

A desalination plant 15 of this kind can be operated alternatively in two different operating modes: in one operating mode, the desalination units 15a-15d are operated without the thermal vapor compression devices 39 (valve V9 closed), in order to achieve maximum electricity production. In the other operating mode, the thermal vapor compression devices 38 are likewise operated, in order to maintain the production of drinking water, while the electricity requirement is low at times or seasonally.

One advantage of this configuration is that the supplementary firing in the heat recovery steam generator, which normally has to be designed for partial load operation of the gas turbine, can be reduced in its size, because less steam is required for the desalination of the same amount of water as a result of the combined operation of the multiple-effect distillation devices 38 and the thermal vapor compression devices 39.

The invention claimed is:

1. A method for operation of a combined-cycle power plant with cogeneration, in which method combustion air is inducted in at least one gas turbine, is compressed and is supplied to at least one combustion chamber for combustion of a fuel, and a resultant exhaust gas is expanded in at least one turbine, producing work, and in which method an exhaust gas which emerges from the at least one turbine is passed through a heat recovery steam generator in order to generate steam, wherein the heat recovery steam generator is part of a water-steam circuit, wherein heat is provided by extracting steam from at least one steam turbine, the method comprising:
    passing a portion of the inducted combustion air through the at least one turbine to the heat recovery steam generator without being involved in the combustion of the fuel in the at least one gas turbine to restrict electricity production while heat provided by the extracting of steam from the at least one steam turbine remains constant; and
    using the portion of the combustion air that is passed through the at least one turbine without being involved in the combustion of the fuel in the at least one gas turbine to operate at least one supplementary firing in the heat recovery steam generator; and
    increasing a mass flow of the portion of the inducted combustion air that is passed through the at least one turbine to the heat recovery steam generator without being involved in the combustion of the fuel in the at least one gas turbine at low load operation relative to high load operation,
    wherein the steam extracted is used in a desalination plant selectively operated with low-pressure steam or intermediate-pressure steam, and in order to restrict the electricity production, the operation of the desalination plant is additionally converted from intermediate-pressure steam to low-pressure steam.

2. The method as claimed in claim 1, wherein the at least one combustion chamber has only one combustion chamber and the at least one turbine has only one turbine.

3. A method for operation of a combined-cycle power plant with cogeneration, in which method combustion air is inducted in at least one gas turbine, is compressed and is supplied to at least one combustion chamber for combustion of a fuel, and a resultant exhaust gas is expanded in at least one turbine, producing work, and in which method an exhaust gas which emerges from the at least one turbine is passed through a heat recovery steam generator in order to generate steam, wherein the heat recovery steam generator is part of a water-steam circuit, wherein heat is provided by extracting steam from at least one steam turbine, the method comprising:
    passing a portion of the inducted combustion air through the at least one turbine to the heat recovery steam generator without being involved in the combustion of the fuel in the at least one gas turbine to restrict electricity production while heat provided by the extracting of steam from the at least one steam turbine remains constant; and
    using the portion of the inducted combustion air to operate at least one supplementary firing in the heat recovery steam generator,
    wherein the at least one combustion chamber is comprised of a first combustion chamber and a second combustion chamber that are sequentially arranged and wherein the at least one gas turbine is designed for sequential combustion and has two sequentially arranged combustion chambers comprising the first and second combustion chambers and wherein the at least one turbine in which the resultant exhaust gas is expanded is comprised of two turbines for expansion of the resultant exhaust gases,
    wherein the portion of the inducted combustion air which is not used for combustion of the fuel is provided for operation of the at least one supplementary firing by switching off the second combustion chamber.

4. The method as claimed in claim 3, wherein the at least one gas turbine is provided with variable inlet guide vanes which are set at the same time to a maximum open position when the second combustion chamber is switched off.

5. The method as claimed in claim 1, wherein the at least one supplementary firing is operated at an input to the heat recovery steam generator.

6. The method as claimed in claim 5, wherein the heat recovery steam generator contains a first superheater, and the at least one supplementary firing is operated downstream from the first superheater.

7. The method as claimed in claim 1, wherein the desalination plant comprises units for multiple-effect distillation that operate with low-pressure steam, each of said units comprising an apparatus for thermal vapor compression which operates with intermediate-pressure steam and is switched on in order to restrict the electricity production.

8. A combined-cycle power plant comprising:
    at least one gas turbine with a compressor for compression of inducted combustion air, a first combustion chamber for combustion of a fuel using the compressed combustion air, and at least one turbine for expansion of exhaust gases created during the combustion;
    a water-steam circuit with at least one steam turbine and a heat recovery steam generator through which exhaust gases which emerge from the at least one gas turbine flow, wherein a capability to extract steam is provided for the at least one steam turbine; and a controllable bypass provided in the at least one gas turbine, via which a portion of the compressed combustion air is introduceable into the at least one turbine by bypassing the first combustion chamber; and a supplementary firing is provided in the heat recovery steam generator, in which fuel can be burnt in order to heat the exhaust gases introduced, using the combustion air which is passed via the bypass, wherein the controllable bypass is controlled such that a mass flow of the portion of the combustion air that is introduced into the at least one turbine by bypassing the first combustion chamber via the controllable bypass is greater during low load operations as compared to high load operations, wherein the combined-cycle power plant has an associated desalination plant comprising multiple-effect distillation devices supplied with low-pressure steam from the at least one steam turbine, each of the multiple-effect distillation devices comprising an associated thermal vapor compression device operable with intermediate-pressure steam from the at least one steam turbine.

9. The combined-cycle power plant as claimed in claim 8, wherein a valve is arranged in the bypass.

10. The combined-cycle power plant as claimed in claim 8, wherein the at least one gas turbine is designed for sequential combustion, and has a second combustion chamber, such that the first and second combustion chambers are two sequentially arranged combustion chambers and the at least one turbine for expansion of the exhaust gases created during the combustion is comprised of two turbines for expansion of the exhaust gases.

11. The combined-cycle power plant as claimed in claim 8, wherein the controllable bypass comprises a valve that is controllable to adjust an amount of the portion of the compressed combustion air that is passed through the bypass to bypass the first combustion chamber.

12. The combined-cycle power plant as claimed in claim 11, wherein the controllable bypass is configured such that each and every combustion chamber of the gas turbine is bypassed by the portion of the compressed combustion air that is passed through the bypass.

13. The combined-cycle power plant as claimed in claim 8, wherein the controllable bypass is configured to restrict electricity production of the at least one gas turbine while heat provided by extraction of steam by the at least one steam turbine remains constant.

14. The method as claimed in claim 1, wherein the passing the portion of the inducted combustion air through the at least one turbine to the heat recovery steam generator without being involved in the combustion of the fuel in the at least one gas turbine to restrict electricity production while heat provided by the extracting of steam from the at least one steam turbine remains constant comprises:

passing the portion of the inducted combustion air through at least one controllable bypass such that the portion of the inducted combustion air bypasses the at least one combustion chamber and is not involved in the combustion of the fuel in the at least one gas turbine, the at least one controllable bypass having a valve to control an amount of the portion of the inducted combustion air that passes through the at least one controllable bypass.

15. The method as claimed in claim 3, wherein the portion of the inducted combustion air additionally bypasses the first combustion chamber.

16. The combined-cycle power plant as claimed in claim 8, wherein the supplementary firing comprises a first supplementary firing arranged in the heat recovery steam generator at an input of the heat recovery steam generator, and a second supplementary firing arranged downstream from a first superheater.

17. The combined-cycle power plant as claimed in claim 8, wherein the thermal vapor compression devices are designed such that they can be switched off.

* * * * *